Patented Dec. 2, 1930

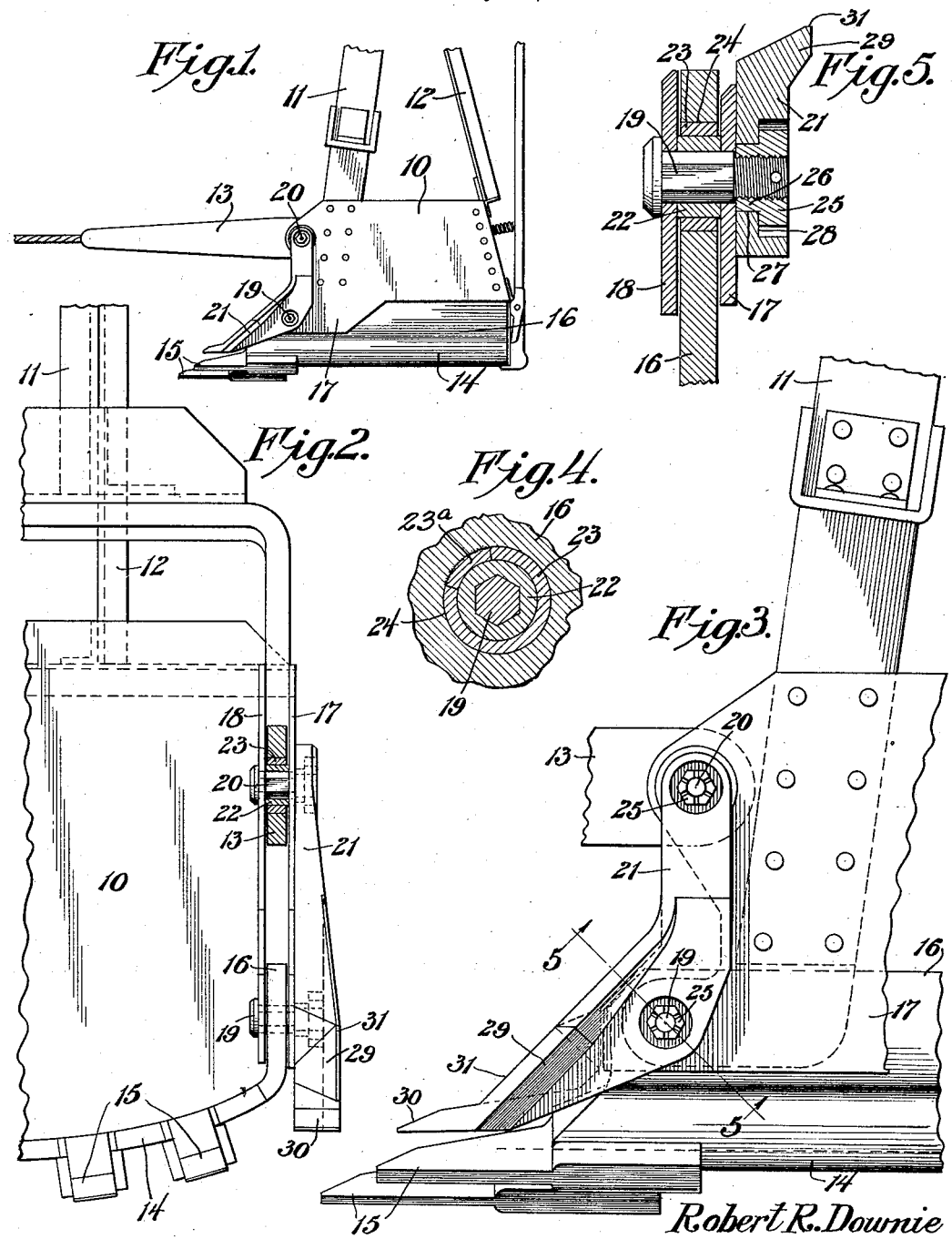

1,783,831

UNITED STATES PATENT OFFICE

ROBERT REX DOWNIE, OF BEAVER FALLS, PENNSYLVANIA, ASSIGNOR TO KEYSTONE DRILLER COMPANY, OF BEAVER FALLS, PENNSYLVANIA, A CORPORATION OF PENNSYLVANIA

EXCAVATOR SCOOP

Application filed May 22, 1926. Serial No. 111,002.

This invention relates to excavator scoops, and among other objects, aims to simplify, strengthen and add to the life and efficiency of certain parts thereof, to minimize the number of the parts, and to facilitate assembly of the scoop.

The invention may be understood by reference to one illustrative embodiment shown in the accompanying drawings, in which:

Figure 1 is a side elevation of a scoop.

Figure 2 is a partial front elevation of the same enlarged, the bail and upper bushings being shown in section.

Figure 3 is an enlarged side elevation of the front portion of the scoop.

Figure 4 is a fragmentary sectional view taken transversely of one of the pivot bolts.

Figure 5 is a section taken on the line 5—5 of Figure 3.

The invention is shown in connection with a scoop 10, which is carried by the usual boom-supported ditcher stick 11 and bail 12. The scoop is also provided with the usual pivoted bail 13 to which a power line is attached, and with a pivoted bottom 14, provided with digging teeth 15 at one edge, all as disclosed in Patent 1,511,114 dated Oct. 7, 1924.

The scoop bottom 14 is provided at each side with a flange 16, extending upwardly between the outer side plate 17 and the inner side plate 18, and pivotally mounted on a bolt 19, while each end of the bail 13 is similarly mounted on a bolt 20. As shown, the outer plates 17 are cut away, and the bottom flanges 16 extend upwardly far enough to close the space provided by cutting away said plates. Thus extra weight is added to the bottom where it is needed, and thus the bottom is strengthened, without adding greatly to the weight of the entire scoop. The bottom flanges are also advantageous in guiding the material when dumping into a wagon. Each of the bolts 19 and 20 is polygonal in cross section, as shown in Figures 2 and 5, and is received by companion bushings mounted in the flange 16 or the end of the bail 13, as the case may be. The side rake tooth 21 is also rigidly secured to the outer side plate 17 by the bolts 19 and 20.

The inner bushing 22 fits the polygonal bolt and acts as a spacing collar between the side plates 17 and 18, while the outer bushing 23 is secured in a hole 24 in the pivoted member, and is rotatable about the inner bushing 22. The outer bushing 23 is secured in any suitable manner against rotation with respect to the member 16, one way being to make said bushing in two arcuate segments, with the smaller segment 23a (Fig. 4) welded to the wall of the hole 24.

Referring to Fig. 5, the end of the bolt 19 is threaded, and receives a shouldered lock nut 25 having a reduced inner portion 26, which is received within a bore 27 in the side rake tooth 21, and the shoulder of the nut bears against a corresponding shoulder 28 in the rake tooth to clamp the latter to the outer side plate 17. When the nut 25 is tightened, therefore, the course of the pressure is through the metal of the rake tooth, the outer side plate 17, the inner bushing 22 and the inner side plate 18 to the head of the bolt.

By this construction, the bail 13 and bottom 14 have free pivotal movement about the respective bolts 20 and 19, while the side rake tooth is rigidly secured by these same bolts. The side rake tooth is formed with a flange 29, projecting laterally in front of the lower pivot bolt, and protecting the latter. The lower end of the rake tooth extends forwardly, and is beveled, as shown at 30, while the front edge of the flange 29 is sharpened, as shown at 31, and is inclined upwardly and rearwardly at an acute angle, so as to divide the material in a vertical plane as the scoop operates.

In constructing a scoop of this type, the bottom pivot should be placed as low and as far toward the open end of the scoop as possible, in order to secure the most effective opening and closing action of the bottom. This is an extremely important consideration because the bottom is not positively actuated, but its motion is effected only by the manipulation of the lines; and the farther the bottom pivot can be placed from the center of gravity of the bottom, the more pronounced will be the pendulum-like action of the bottom.

In securing the side rake tooth, whenever separate bolts are used, they must be placed above or to the rear of the bottom pivot bolt for the obvious reason that the tooth must precede the bottom pivot bolt in passage through the material, because an important function is to protect that bolt. Then, if the rake tooth is to have a given protrusion or length of blade ahead of the wall edge, and is to have a given lifting strength at the digging point, it must be made heavier at the major fastening point, and must have a greater length of shank to the rear of that point, if the stress on the bolts at the upper end is to be kept within given limits, than would be necessary if the major fastening were located closer to the digging point. It is found, therefore, that the bottom pivot bolt and the major fastening of the side rake tooth should logically occupy the same position with reference to the digging edge of the scoop, and hence the utility of a single bolt adapted to form part of the pivotal connections for the bottom, and also to receive the heavy stresses from the side rake tooth.

An advantage resulting from the combination bottom pivot and tooth fastening bolt, second only to that mentioned above, is that it facilitates the use of the most appropriate shape of side rake tooth. As stated above, an important function of the rake tooth is to dig the clearance for the bottom pivot bolt, and for this reason it must have a digging edge above and ahead of that bolt. Now, the most effective shape of rake tooth is found by experiment to be somewhat like that of a plow share, so that it will first divide the material horizontally, and then in a vertical plane at as acute a shearing angle as possible. Thus, considerations as to the proper shape of rake tooth tend to place the body of the tooth below the bottom pivot bolt, whereas the necessity of protecting that bolt tends to keep the body of the tooth above and ahead of it. Now, if the rake tooth were not fastened by the bolt itself, and yet were made so as to protect the bolt, its body would have to be placed entirely above the bottom pivot bolt, thus necessitating a greater extent of rake tooth ahead of the wall in order to preserve the suitable acute angle of inclination for the shearing edge, or else the body of the tooth would have to have a large opening formed therein to accommodate the nut of the bottom pivot bolt and give clearance room for a wrench to turn the nut. Such a construction would obviously waste metal, because of its division in a disadvantageous direction. Since a critical point in the strength of a rake tooth is its capacity to resist lateral pressures upon the point, which tend to bend the point toward the center line of the scoop, these pressures resulting from the scoop being forced into converging and hard surfaces. When the tooth is fastened by the bolt which it protects, this permits the shearing edge of the body of the tooth to be brought as close as possible to the bolt, and at the same time permits the rake tooth to be solid except for the hole required for the bolt itself.

The bushings and the accompanying parts are all of such dimensions as to permit free assembly, requiring no force fits whatever. This permits them to be easily assembled or disassembled, and also avoids the risk of injuring the parts assembled. The only tool required for assembly is a wrench for tightening the nuts. The polygonal shape of that portion of the bolt which extends from the head through the inner side plate, the inner bushing and the outer side plate, effectively holds the inner bushing from turning on the bolt, and since the inner bushing is clamped firmly between the inner and outer side plates, it is positively held against any lateral motion, while it serves as an effective spacer for the wall portions.

The easy assembly of the parts results in the greatest durability. This is attainable because the bushings can be made of special steel selected for the greatest resistance to wear, without the interference of any such considerations as malleability for beading, toughness for bending strength and the like. Removing the function of radial wear from the pivot bolt, permits a specializing of it in the direction of strength, without sacrifice for hardness.

The side rake teeth shown herein are described and claimed in a divisional application Serial No. 158,739, filed January 3, 1927.

Obviously the present invention is not restricted to the particular embodiment thereof herein shown and described. Moreover, it is not indispensable that all the features of the invention be used conjointly since they may be employed advantageously in various combinations and subcombinations.

What is claimed is:

1. The combination with an excavating scoop having side walls and a member spanning the width of the scoop, of a pivot member at each side connecting the spanning member with the side wall, a rake tooth at each side, and means cooperating with the pivot member to rigidly secure the rake tooth to the side, a portion of the rake tooth extending in front of the pivot member and said cooperating means to protect the same from injury during the digging operation.

2. The combination with an excavating scoop having side walls and a bottom, of a bolt in each side wall constituting a pivot for the bottom, and a side rake tooth secured rigidly by said bolt to the side wall and extending in front of the bolt to provide clearance for the same during the digging operation.

3. The combination with an excavating scoop having side walls and a bottom, of pivot members connecting the bottom with the side walls, a rake tooth at each side, and means cooperating with the respective pivot members to rigidly secure the rake teeth to the side walls, each rake tooth having a flange extending in front of the projecting portion of the pivot member to protect the same and formed with an upwardly and rearwardly inclined sharpened edge to cut a clearance for the side wall and said projecting portion of the pivot member.

4. An excavator scoop, comprising side walls having inner and outer spaced plates, a bottom having at each side an upstanding flange extending between the inner and outer plates, a rake tooth positioned against the outer face of the outer plate, and a bolt extending through said inner plate, said flange, said outer plate and the rake tooth, said bolt serving at the same time to hold the bottom to its correct axis of movement and to secure the rake tooth rigidly to the scoop.

5. In an excavator scoop, the combination of a side wall having outer and inner plates spaced apart, a pivoted member extending into the space between the wall plates, a pivot bolt extending through said wall plates and said pivoted member, said bolt having a fixed position with reference to the wall plates, a removable inner bushing upon the bolt and fixed against rotation with reference thereto, a removable outer bushing on said inner bushing and movable circumferentially thereof, said outer bushing being fixed against rotation with reference to the pivoted member, whereby said pivoted member is pivotally connected to the wall plates and all of the wear of the pivot falls upon the removable inner and outer bushings.

6. An excavating scoop comprising, in combination, a relatively fixed member and a pivoted member; a non-circular pivot bolt therefor; and companion bushings secured respectively to said bolt and to one of said members and being rotatable one on the other.

7. An excavating scoop comprising, in combination, two pivoted members; and a renewable bushing interposed between the two surfaces of the respective members which provide a pivot, so as to take the wear due to the stresses on the pivot; said renewable bushing being segmental, and the smaller segment thereof being secured to one of the pivoted members, while the larger segment is removable by longitudinal displacement.

8. An excavating scoop comprising, in combination, two pivoted members; and means pivotally connecting said members including a bolt secured to one of said members so as to be immovable; and a bushing surrounding the bolt and rotatable relative to the bolt; said bushing consisting of two arcuate segments, the smaller of which is secured within a hole pierced in the other pivoted member, the larger segment being readily removed by driving it endwise, and being held from rotation within the hole by its contact with the smaller segment.

9. An excavating scoop comprising, in combination, two pivoted members; and means pivotally connecting said members including a bolt secured to one of said members so as to be immovable; coaxial bushings carried by the bolt, one bushing being fixed against rotation on the bolt, the second bushing surrounding the first bushing and being rotatable thereon; said second bushing consisting of two arcuate segments, the smaller of which is secured within a hole pierced in the other pivoted member, the larger segment being readily removed by driving it endwise, and being held from rotation within the hole by its contact with the smaller segment.

10. An excavating scoop comprising, in combination, a body having sides with two spaced plates and having a bottom with side flanges received between the two pairs of spaced plates; and means pivoting the bottom to each of the sides comprising a bolt passing through the flange and the spaced plates; a bushing surrounding the bolt and spacing the two plates apart at that point; and another bushing surrounding the first bushing and rotatable thereon; and means securing the outer bushing to the flange of the bottom through which it passes.

11. An excavating scoop comprising, in combination, a body having sides with two spaced plates and having a bottom with side flanges received between the two pairs of spaced plates; and means pivoting the bottom to each of the sides comprising a bolt passing through the flange and the spaced plates; a bushing surrounding the bolt and spacing the two plates apart; and another bushing surrounding the first bushing and rotatable thereon; and means securing the outer bushing to the flange of the bottom through which it passes; said outer bushing being shorter than the distance between the two side plates of the scoop body, so that all the wear takes place on the contacting surfaces of the two bushings.

12. An excavating scoop comprising, in combination, a body having sides with two spaced plates and having a bail whose ends are received between the two pairs of spaced plates; and means pivoting the bail to each of the sides comprising a bolt passing through the bail and the spaced plates; a bushing surrounding the bolt and spacing the two plates apart; and another bushing surrounding the first bushing and rotatable thereon; and means securing the outer bushing to the bail end through which it passes.

13. An excavating scoop comprising, in combination, a body having sides with two spaced plates and having a bail whose ends are received between the two pairs of spaced plates; and means pivoting the bail to each of the sides comprising a bolt passing through the bail and the spaced plates; a bushing surrounding the bolt and spacing the two plates apart; and another bushing surrounding the first bushing and rotatable thereon; means securing the outer bushing to the bail end through which it passes; said outer bushing being shorter than the distance between the two side plates of the scoop body, so that all wear takes place on the contacting surfaces of the two bushings.

14. An excavator scoop comprising, in combination, two pivoted parts; and means pivotally connecting said parts comprising a bolt non-rotatably secured to one of the pivoted parts and a bushing non-rotatably secured to the other part, said bushing being rotatable axially relative to the bolt; a side rake tooth having a bore and a counterbore, thus providing an annular shoulder; the bolt passing through said bore; a nut screwed on the end of the bolt and bearing against the annular shoulder, so as to secure the side rake tooth; the nut being seated within the counterbore so as to be protected by the side rake tooth.

15. An excavator scoop comprising, in combination, a scoop body; and a member pivotally connected to the sides of said body; each side including two spaced plates; and pivotal connections between the member and the scoop each comprising a bolt, a bushing surrounding the bolt; and a second bushing surrounding the first and freely rotatable thereon, the second bushing being fixed to the aforesaid member; a side rake tooth having a bore and a counterbore, thus providing an annular shoulder; a nut screwed on the end of the bolt and having a reduced portion small enough to pass through the bore and bear against one of the side plates, the head of the bolt then bearing against the other side plate; the bushing which is directly carried by the bolt being gripped between the side plates when the nut is screwed down; the nut being wholly within the confines of the side rake tooth and so protected thereby.

16. An excavating scoop comprising, in combination, a body; a bail pivotally connected thereto; a dumping bottom pivoted to the body; and teeth rigidly secured to the body by bolts whose axes coincide with the pivotal axes of the bail and bottom aforesaid.

17. An excavating scoop comprising, in combination, a body; a bail pivotally connected to the body; a dumping bottom pivoted to the body at the same end; and teeth on each side of the body spanning the distance between the pivots of the bail and of the scoop bottom and secured to said sides by elements which form parts of the aforesaid pivotal connections.

18. An excavating scoop comprising, in combination, a body; a pivoted bail; a pivoted bottom; two side rake teeth; and four bolts fastening the bail, the bottom and the side rake teeth upon the scoop body so that the bail and bottom freely move about their pivotal axes, while the teeth are secured absolutely immovably, yet are readily removed.

19. An excavating scoop comprising, in combination, a body; a bail; a bottom; two side rake teeth; and means pivotally connecting the bail and bottom respectively to the same end of the scoop but spaced from each other; said pivotal connections including bolts which when tightened secure the side rake teeth absolutely immovably, and including elements permitting free swinging of the bail and bottom irrespective of the degree of tightness of the bolts.

20. An excavator scoop comprising, in combination, a body; a bottom; a hauling bail; two side rake teeth; and pivotal connections for the bail and the bottom whereby each may swing relative to the body; said pivotal connections including four bolts, two of which pass through each tooth to secure it on the side of the scoop body when the nuts of the bolts are tightened; the parts being so constructed and arranged that detachment of the bail requires only the removal of the two upper bolts, detachment of the bottom requires only the removal of the two lower bolts, and either detachment may be effected without causing the teeth to lose their position in the assembly, while detachment of the rake teeth requires removal of the nuts only without disturbance of the bolts, bottom or bail.

21. An excavating scoop, comprising, in combination, a body; a pivoted bottom; a hauling bail; and side rake teeth secured to the excavating end of the body and made fast on the outside of the side walls of the body and being so constructed and arranged that each tooth protects the two pivotal connections between the bail and the body and the bottom and the body on the side of the scoop on which it is placed.

22. An excavating scoop, comprising, in combination, a body; a pivoted bottom; a hauling bail; and side rake teeth secured to the excavating end of the body and fast to the outside of the side walls of the body and being so constructed and arranged that each tooth protects on one side of the scoop the pivotal connections between the bail, the bottom and the body; said pivotal connections being substantially confined between the outer face of each tooth and the inside of the scoop so that no parts of the pivotal connections project beyond the outer side face of either tooth to be subjected to the wear and tear of excavation.

23. An excavating scoop comprising, in combination, a body having sides with two spaced plates, and also having a bottom with projecting parts received between the two pairs of spaced plates; a bail whose ends are received between the two pairs of spaced plates; and similar pivotal connections joining the two ends of the bail and also the bottom with the opposite sides of the scoop; each of the four pivotal connections including a bolt, each pivotal connection so made that its bolt may be tightened as much as may be desired and yet permit free swinging of the pivoted parts.

24. An excavating scoop comprising, in combination, a body whose sides have inner and outer spaced plates, the inner plates extending from the bottom to the top of the body; a hauling bail pivotally connected to the scoop between the side plates; a scoop-supporting bail having its arms extending between and secured to the side plates; and a bottom pivoted between the side plates.

25. An excavating scoop comprising, in combination, a body having sides with two spaced plates; said body also having a bail whose ends are received between the two pairs of spaced plates, and also having a bottom with side flanges received between the two pairs of spaced plates; and similar pivotal connections joining the two ends of the bail and also the two flanges of the bottom with the opposite sides of the scoop; each of the four pivotal connections including a bolt; and a side rake tooth on each side of the scoop and made fast to the scoop by means of two of said bolts.

26. An excavating scoop comprising, in combination, a body having sides with spaced plates; and a bottom pivoted to the sides of the scoop by means fast to and bridging the space between the side plates, said bottom pivoting means being constructed to withstand the shocks imparted to the bottom during use of the scoop, thereby permitting free swinging of the bottom at all times.

27. An excavator scoop comprising, in combination, a body having sides; each of the sides being made up of inner and outer spaced plates secured together; a member pivoted to the sides; and pivotal connections between the member and the sides, each pivotal connection comprising a headed fastener member having its head inside the inner plate and bearing against the same, said fastener member designed to withstand tensile stresses when in position and to be readily removed when desired, and a bushing non-rotatable on the shank of the headed fastener member but readily removable therefrom; said bushing being relatively rotatable with respect to the pivotal member which surrounds it.

28. An excavating scoop having its opposite side walls each consisting of two spaced plates; means fast to the plates at each side of the scoop for supporting the scoop; means pivoted to the plates at each side of the scoop for causing the scoop to move to excavate material; and means pivoted to the plates at each side of the scoop to discharge the material excavated.

29. An excavating scoop comprising, in combination, a body; a bail pivotally connected to the scoop body between the sides thereof; a bottom having opposed upstanding side flanges; and pivotal connections between the sides of the scoop and the flanges of the bottom so that the bottom is pivoted at one end of the scoop; said flanges extending the length of the scoop body.

30. An excavating scoop comprising, in combination, a body having an open end and substantially parallel sides; and a bottom pivoted to each of said sides at a low point thereof and extending between said sides to close the scoop, said bottom having integral longitudinal flanges extending the length of the scoop and being parallel to each other; the sides of the scoop being cut away for the greater portion of their length to expose the flanges, which close the gaps thereby made.

In testimony that I claim the foregoing as my own, I have hereto affixed my signature.

ROBERT REX DOWNIE.